United States Patent Office 3,095,351
Patented June 25, 1963

3,095,351
STABILIZATION OF INSECTICIDES
Kenneth L. Godfrey, Kirkwood, and Henry L. Morrill, Clayton, Mo., assignors to Monsanto Chemical Company, St. Louis, Mo., a corporation of Delaware
No Drawing. Filed Aug. 31, 1959, Ser. No. 836,876
3 Claims. (Cl. 167—30)

This invention relates to insecticides and emulsion formulations thereof. More specifically the invention relates to phosphorothioates and phosphonothioates, particularly those derived by the interreaction of the corresponding acid halides and an organic hydroxy compound, such as an alcohol or a phenol.

It is conventional to formulate the alkyl esters of phosphorothioic acid and of phosphonothioic acid as aqueous emulsions or dispersions, and for this expedient it is necessary to incorporate, either in the concentrate or in the final emulsion, a suitable stabilizing agent in order to prevent the separation of the water and the said esters. It has been found that emulsions or dispersions so prepared are stable initially, but upon standing a chemical reaction may take place and the aqueous formulations become increasingly unstable and eventually the emulsifier or dispersing agent is decomposed, or otherwise rendered ineffective, thereby inducing a separation of the components. The duration of the stable period will vary with the chemical structure of the phosphorus ester and also with the chemical properties of the dispersing or emulsifying agent. Eventually all or any of the conventional wetting, emulsifying and dispersing agents will become ineffective.

This invention is particularly useful in the preparation, storage and use of the flowable aqueous concentrates in which the esters of phosphorothioic acids or the esters of phosphonothioic acids are in contact with the hydrolytic effects of water.

It has been found that when the esters of phosphorothioic acid or the esters of phosphonothioic acid are prepared from the acid chlorides there is inevitably a small proportion of the unreacted acid chloride in the resulting insecticidal compound. If the insecticides, or the esters of phosphorothioic acid, or esters of phosphonothioic acid for any other use, are formulated under conditions such that water will be present, the ensuing hydrolysis results in the instability of aqueous emulsions.

Examples of insecticidal compounds which can be treated in accordance with this invention and thereby made suitable for the preparation of stable aqueous emulsions are as follows.

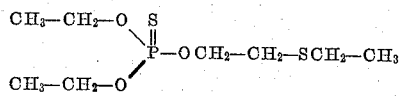

O,O-diethyl O-2-(ethylthio) ethyl phosphorothioate

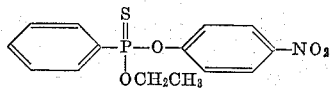

O-ethyl O-p-nitrophenyl phenyl phosphonothioate

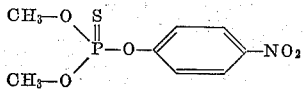

O,O-dimethyl O-p-nitrophenyl phosphorothioate (methyl parathion)

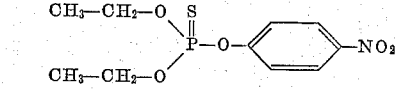

O,O-diethyl O-p-nitrophenyl phosphorothioate

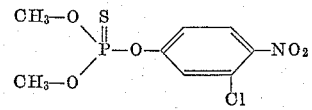

O-(3-chloro-4-nitrophenyl) O,O-dimethyl phosphorothioate

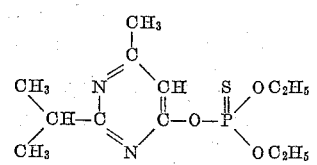

O,O-diethyl O-(2-isopropyl-4-methyl-6-pyrimidyl) phosphorothioate

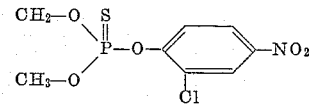

O-(2-chloro-4-nitrophenyl) O,O-dimethyl phosphorothioate

It is evident that homologues, isomers and analogues having the phosphorothioyl or the phosphonothioyl structures are most readily prepared from the corresponding acid chlorides and will be subject to the described deleterious reaction, and aqueous formulations prepared therefrom will be unstable. Thus the need for more stable dispersions and emulsions and the adaptability of the invention to these needs are well within the province of one skilled in the art.

In accordance with this invention it has been discovered that the stability of the phosphonothioate or the phosphorothioate emulsions or dispersions containing acid chloride as an impurity can be greatly improved if the formulation of the said phosphorus compound, or the compound prior to formulation, is treated with gaseous or aqueous ammonia. If the said phosphorus compound is treated with gaseous ammonia prior to formulating, it may be desirable to wash out the reaction product, ammonium chloride, or remove it by filtering. If the insecticides are treated with aqueous ammonia, the ammonium chloride will be dissolved in the water and may be discarded as such or it may be allowed to remain in the aqueous phase. In the preparation of formulations the ammonia may be present as ammonium hydroxide in the water used in making up the stable formulation.

The preferred formulations, which are stabilized by the practice of this invention, are known to the art as flowable concentrates which can be diluted with water to form emulsions or suspensions suitable for spraying on plants, buildings, or other insect infested areas.

The concentrates may have from 40% to 85% by weight of the insect toxic phosphorus containing ester, from 10% to 50% water, and from 2% to 15% of a suitable emulsifier or dispersing agent. In addition, the compositions may contain small quantities of suspended solid particles, for example up to 5%, small proportions of up to 5% of organic solvents, and other insecticidal aids, such as adhesives to promote the adherence to the leaves or other surfaces being treated, and other compounds possessing biological toxic properties.

A critical component of the insecticide formulation is the emulsifying agent which may be a cationic, non-ionic or an anionic compound. These compounds induce stability in emulsions because they possess both hydrophilic and hydrophobic characteristics. These functions are usually inherent in the structure of the molecule, whereby one portion is attracted to the aqueous phase and another portion attracted to the oil phase. This enables an intimate mixture of the immiscible liquids.

The cationic emulsifiers may be quaternary ammonium compounds, such as tetramethyl ammonium chloride and the amine salts, such as octadecyl amine hydrochloride. The essential characteristic of this type of emulsifier is that which is capable of ionization to a negatively charged halogen ion and a positively charged hydrophobic ion. Phosphonium salts and sulfonium salts are also useful. Although a wide variety of cationic emulsifying agents are known, they are in general less important than other types of emulsifying agents.

The non-ionic emulsifying agents include the molecules wherein the hydrophobic portion and the hydrophilic portion are separated by ether linkages. These include the various ethylene oxide or propylene oxide condensates with fatty alcohols, such as oleyl alcohol to which six moles of ethylene oxide has been added, or the alkyl phenols condensed with ethylene or propylene oxide, such as p-nonyl phenol condensed with eight moles of ethylene oxide. The non-ionic emulsifiers may also contain ester groups separating the hydrophobic and hydrophilic radicals of the compound, for example glycerol mono-stearate and the mono-oleate of propylene glycol. The non-ionic emulsifiers may also contain amide groups, such as lauroyl diethanolamide.

The most significant class of emulsifying agents are the anionic types, which include the common soaps, such as sodium stearate, sodium palmitate, and rosin soaps. Other types are the sulfated oils, such as the sulfated ester of ricinoleic acid. The sulfate may be based on the alcohols, such as the sodium salt of polyoxyethylene sulfate and sodium alkyl polyoxyethylene sulfate. Other types of anionic emulsifiers are the alkyl methyl sulfonate of aliphatic hydrocarbons, such as the sodium salt of isethionic acid and the sulfonates of alkyl aromatic hydrocarbons, such as the sodium salt of sulfonated tetradecyl benzene.

The organic solvents useful in these compositons are those which are solvents or partial solvents for any of the components of the formulations. They may be water soluble, such as the alcohols, ketones or aldehydes. They may be insoluble in water or partially soluble as the hydrocarbons, such as benzene, toluene and xylene. The various chlorinated aromatic and aliphatic hydrocarbons may find use as these optional components.

The solid substances which are also useful optional components are diluents or extenders, but provide minor benefits in designating the areas covered and the degree of application of formulations, which otherwise would be transparent or colorless. Suitable solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica.

In the preparation of suitable compositons for insecticidal use for contact, systemic or residual activity in controlling insect pests, only the dilution of the concentrates with water is necessary. Thus, the formulations for direct use may contain from 0.5% to 10% by weight of the toxicant, from 0.05% to 5.0% of emulsifier, and the balance 85% to 99% of water. The optional components, such as organic solvents and solid diluents, will usually only be present in traces in the formulations for direct use.

Further details in the practice of this invention are set forth in the following examples.

*Example I*

Parathion (O,O-diethyl-O-p-nitrophenyl phosphorothioate) containing 0.037% chlorine, as acid chloride, was formulated with water and as an emulsifier polyoxyethylene sorbitan esters of tall oil acids as follows:

| | Parts by weight |
|---|---|
| Parathion | 44.1 |
| Water | 48.4 |
| Emulsifier | 7.5 |

The mixture was emulsified in a colloid mill. On aging the emulsion for fourteen days it was found that it became progressively more acid. In seven days the pH dropped from 7.64 to 2.56 and in fourteen days it was 2.32. By adding a 2 mol proportion of ammonia based on the chlorine calculated on the intermediate, O,O-diethyl phosphorochloridothioate, the pH of the emulsion was initially increased to 9.5 but at the end of seven days was 3.82, and in fourteen days the pH was 3.08.

The above experiment demonstrates that a 2 mol proportion of ammonia produces a useful result, but it cannot be regarded as permanently stable. By this treatment the chlorine content of the parathion was not reduced below the 0.01%, considered to be the optimum for emulsion stability. One mol of the ammonia is converted to ammonium chloride and an equal amount forms the ammonium salt of the phosphorothioic acid. The parathion was found to be unaffected by the ammonia.

*Example II*

By the use of ammonia in excess of 2 mols more permanent stabilty of the emulsions was atained. The emulsion containing both the intermediate, O,O-diethyl phosphorocloridothioate, and the O,O-diethyl p-nitrophenylphosphorothioate, had the chlorine content reduced to 0.01% and the pH maintained above 7.0 with both a 50% excess and 100% excesses of ammonia. Thus:

| Excess of $NH_3$ | pH of emulsion at days | | | |
|---|---|---|---|---|
| | 0 | 3 | 7 | 14 |
| 50% (3 mols) | 9.78 | 8.78 | 8.14 | 7.14 |
| 100% (4 mols) | 9.84 | 8.82 | 8.12 | 7.42 |

It was apparent that effective results were obtained with 2 mol proportions of ammonia, but much greater stability is obtained with even slight excesses of ammonia, for example 5% to 10%. This desired degree of stability is attained when the chlorine content, other than that dissolved in the aqueous phase as ammonium chloride, is less than 0.01% by weight.

*Example III*

Technical parathion containing 0.037% chlorine was sparged with gaseous ammonia until the chlorine content was reduced to 0.01%. The resulting solid ammonium chloride was removed by filtering. The parathion was then formulated into a concentrate by dispersing it in an equal weight of water containing 5% of an emulsifying agent.

*Example IV*

The procedure of Example III was duplicated except that the solid ammonium chloride was removed by washing with water. Concentrates were then prepared by adding water and an emulsifying agent.

*Example V*

Each of the concentrates prepared in accordance with Examples I to IV are diluted with water in an amount sufficient to produce emulsions of from 1% to 10% O,O-diethyl O-p-nitrophenyl phosphorothioate. Effective insecticidal emulsions were formed which were stable for substantial periods of time.

Experiments with a variety of surface active agents will show that stable emulsified concentrates are formed when sufficient ammonia or ammonium hydroxide is used to reduce the chlorine content of the toxicant to less than 0.01%, and through the use of substantial excesses of ammonia it is possible to reduce the chlorine content to as low as 0.001%. The precise pH and the chlorine content at which an emulsified system will break will vary somewhat with the choice of toxicant and emulsifier, but the stability in all cases will be improved by the treatment with ammonia, which will enable the removal of as much of the chlorine as may be required to effect the desired degree of stability.

The use of ammonia in the practice of this invention is critical. Inorganic bases, including sodium hydroxide, sodium carbonate, calcium hydroxide, are not effective. Amines are also not effective because they cause degradation of the toxicant. The way strong bases, for example, sodium hydroxide, hydrolyze the phosphorothioates and the weaker bases, such as sodium carbonate, do not reduce the chlorine content adequately.

What is claimed is:

1. The method of preparing a stable insecticidal emulsified concentrate of O,O-diethyl, O-p-nitrophenyl phosphorothioate prepared by reacting diethyl phosphorochloridothioate and p-nitrophenol which comprises contacting the said phosphorothioate containing more than 0.01 percent chlorine as acid chloride with gaseous ammonia in sufficient amount to reduce the chlorine content to less than 0.01 percent by weight, filtering to remove the precipitated ammonium chloride, and dispersing the filtrate in water and in emulsifying agents.

2. The method of preparing a stable insecticidal emulsified concentrate of O,O-diethyl, O-p-nitrophenyl phosphorothioate prepared by reacting O,O-diethyl phosphorochloridothioate and p-nitrophenol which comprises contacting the said phosphorothioate containing more than 0.01 percent chlorine as acid chloride with gaseous ammonia in sufficient amount to reduce the chlorine content to less than 0.01 percent by weight, washing the phosphorothioate with sufficient water to dissolve the precipitated ammonium chloride, and dispersing the filtrate in water containing emulsifying agents.

3. The method of preparing a stable insecticidal emulsified concentrate of O,O-dimethyl O-p-nitrophenyl phosphorothioate prepared by reacting O,O-diethyl phosphorochloridothioate and p-nitrophenol which comprises contacting the phosphorothioate containing more than 0.01 percent chlorine as acid chloride with aqueous ammonia in sufficient amount so as to convert the excess unreacted diethyl phosphorochloridothioate to ammonium chlorides and dispersing it in additional water and emulsifying agents.

References Cited in the file of this patent

Frear: Chemistry of the Pesticides (Third Ed.), 1955, pp. 79–82.